US005403029A

United States Patent [19]
Zerbe et al.

[11] Patent Number: 5,403,029
[45] Date of Patent: Apr. 4, 1995

[54] MECHANISM FOR LATCHING A GOOSENECK HITCH TO A TRAILER PLATFORM

[75] Inventors: Randal L. Zerbe, Rockford; Thomas R. Brown, Oregon, both of Ill.

[73] Assignee: E. D. Etnyre & Co., Oregon, Ill.

[21] Appl. No.: 194,880

[22] Filed: Feb. 14, 1994

[51] Int. Cl.⁶ ............................................. B62D 53/06
[52] U.S. Cl. ............................... 280/441.2; 280/425.2; 280/477; 280/509
[58] Field of Search ............... 280/417.1, 423.1, 425.1, 280/441.2, 447, 508, 509

[56] References Cited

U.S. PATENT DOCUMENTS

| | | | |
|---|---|---|---|
| 3,866,947 | 2/1975 | Yakubow | 280/441.2 |
| 3,912,302 | 10/1975 | Patterson | 280/477 |
| 4,413,836 | 11/1983 | Losh | 280/441.2 |

FOREIGN PATENT DOCUMENTS

| | | | |
|---|---|---|---|
| 0012121 | 6/1980 | European Pat. Off. | 280/441.2 |
| 2137151 | 10/1984 | United Kingdom | 280/441.2 |

OTHER PUBLICATIONS

4-Page Brochure entitled *Talbert S-Series* (Bulletin No. 201, publication date unknown).
6-Page Brochure entitled *Trail King Hydraulic Detachable Gooseneck Trailers* (publication date unknown).
4-Page Brochure entitled *Landoll 35 and 50 Ton Series Detachable Gooseneck Trailers* (published Jul., 1988).
1-Page Advertisement entitled *Fontaine Model MRGT-35AWK Mechanical Detachable Gooseneck* (publication date unknown).

*Primary Examiner*—Margaret A. Focarino
*Assistant Examiner*—Victor E. Johnson
*Attorney, Agent, or Firm*—Leydig, Voit & Mayer, Ltd.

[57] ABSTRACT

A gooseneck hitch is latched to a trailer platform by a pin which may be shifted linearly to an unlatched position against the bias of a spring so as to permit removal of the gooseneck from the platform. A first detent unit holds the latch pin in its unlatched position once the pin has been moved to that position and as long as the gooseneck remains in an installed position on the platform. As the gooseneck is removed from the platform, a second detent unit releases the first detent unit from the latch pin but continues to hold the latch pin in its unlatched position. Upon re-installation of the gooseneck, the second detent unit is automatically released from the pin and permits the spring to automatically shift the pin to its latched position.

6 Claims, 5 Drawing Sheets

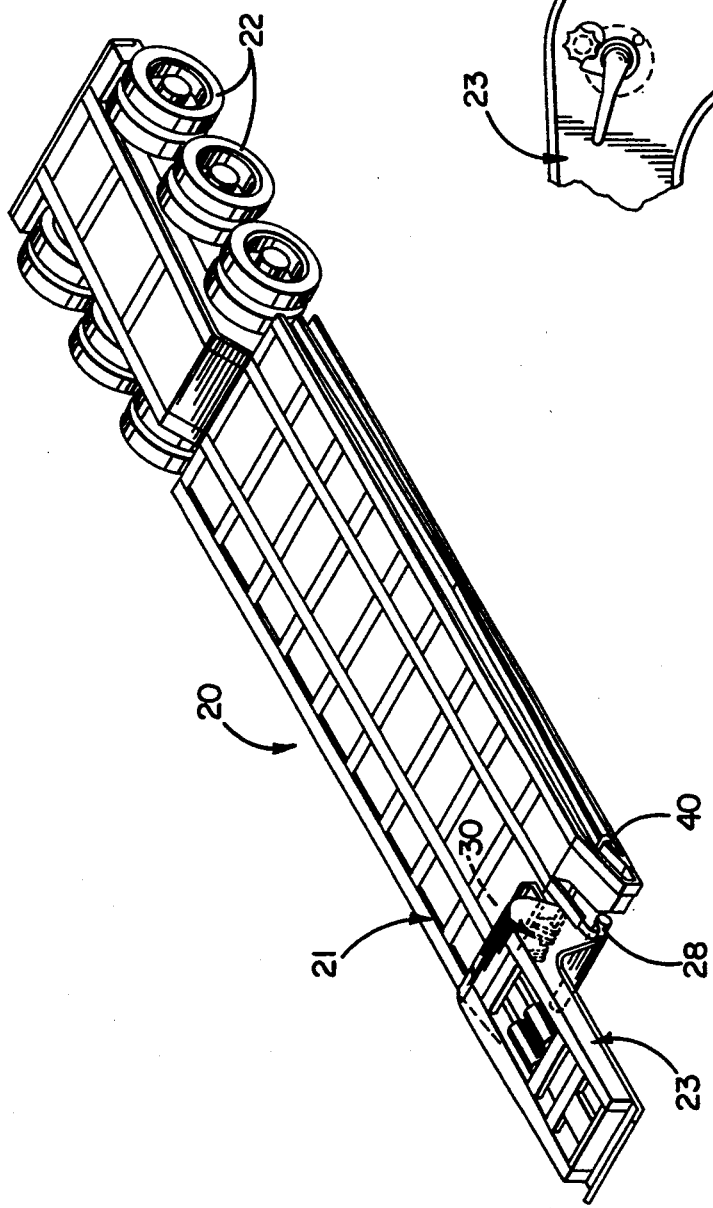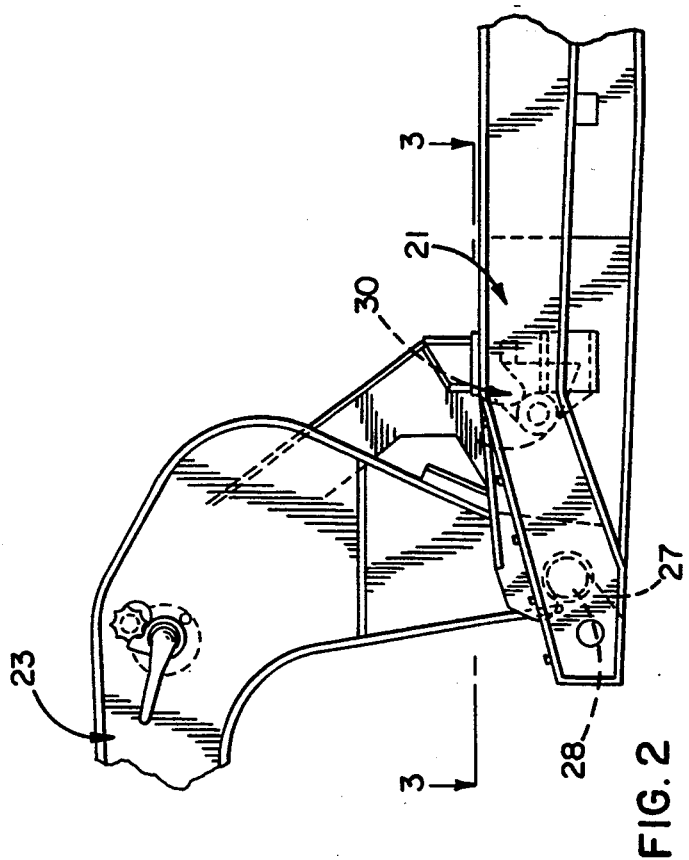

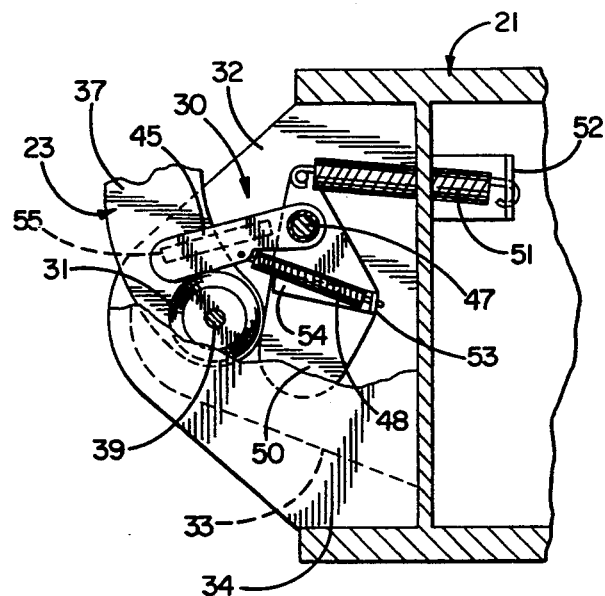
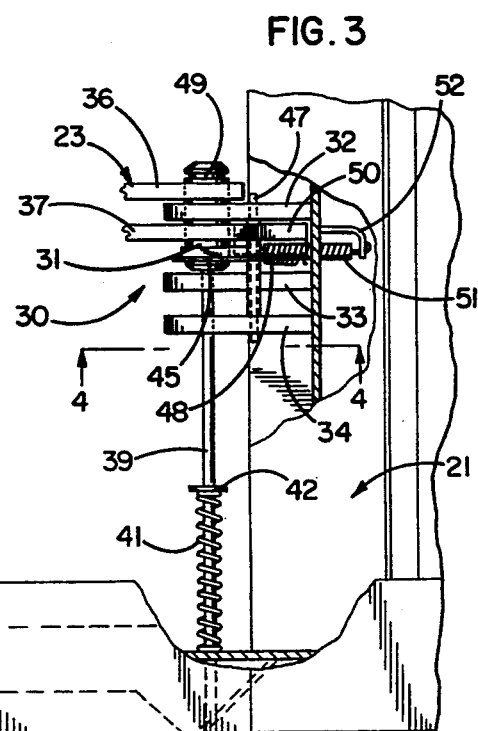
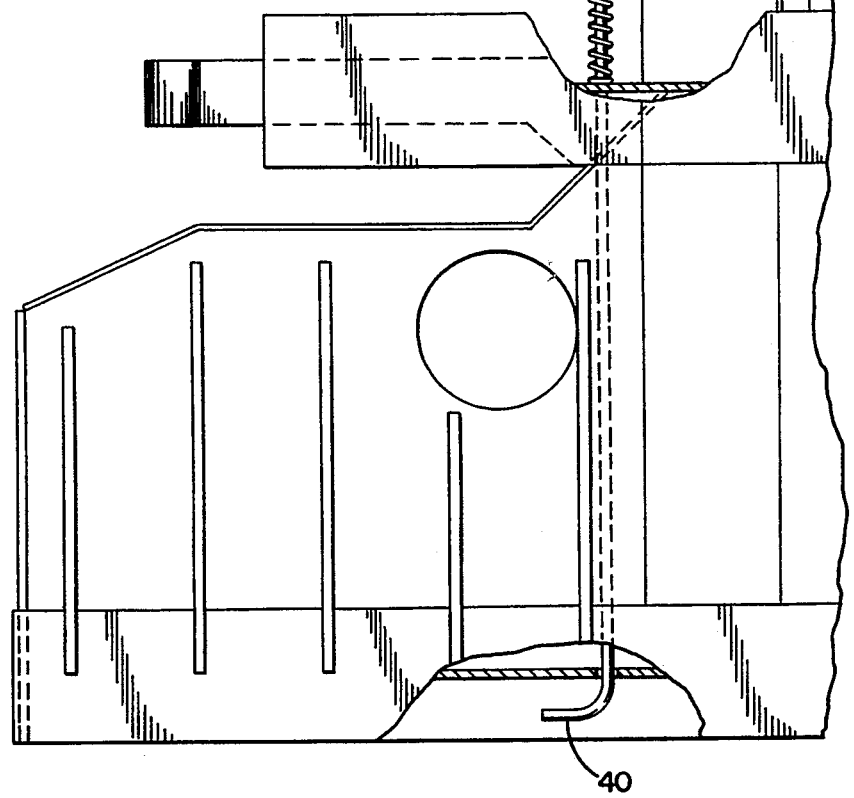
FIG. 4
FIG. 3

5,403,029

MECHANISM FOR LATCHING A GOOSENECK HITCH TO A TRAILER PLATFORM

BACKGROUND OF THE INVENTION

This invention relates generally to a trailer and, more particularly, to a trailer having a wheeled cargo-carrying platform which is adapted to be connected to a towing vehicle by a so-called gooseneck hitch. Such a hitch extends upwardly and forwardly from the forward end of the platform and is adapted to be connected to the fifth wheel coupler of the towing vehicle.

In order to facilitate loading and unloading of the platform, it is desirable to be able to detach the gooseneck from the platform and remove the obstruction presented by the gooseneck. Accordingly, it is conventional to attach the gooseneck to the platform by a latching mechanism which may be released to permit removal of the gooseneck.

Prior latching mechanisms which have been used for this purpose require the trailer operator not only to manually release the mechanism but also to manually relatch the mechanism. Re-latching of the mechanism can be particularly difficult for a single operator since relatching can be effected only after the coupling components of the gooseneck have been properly aligned with the coupling components of the platform.

SUMMARY OF THE INVENTION

The general aim of the present invention is to provide a new and improved gooseneck-to-platform latching mechanism which, after being manually unlatched to permit removal of the gooseneck, is automatically relatched as an incident to returning the gooseneck to its installed position on the platform.

A more detailed object of the invention is to achieve the foregoing by providing a latching mechanism having a latch which, after being moved manually to its unlatched position, is held in that position by a first detenting unit until the gooseneck is removed from its installed position. At that time, a second detenting unit which is responsive to the position of the gooseneck releases the first detenting unit but continues to hold the latch in its unlatched position. When the gooseneck is returned to its installed position, it cams the second detent unit to a position permitting the latch to automatically shift to its latched position and, at the same time, permitting the first detent unit to return to its original position preparatory to the next unlatching operation.

These and other objects and advantages of the invention will become more apparent from the following detailed description when taken in conjunction with the accompanying drawings.

BRIEF DESCRIPTION OF THE DRAWINGS

FIG. 1 is a perspective view of a typical trailer equipped with a new and improved gooseneck latching mechanism incorporating the unique features of the present invention.

FIG. 2 is an enlarged side elevational view of a portion of the trailer shown in FIG. 1.

FIG. 3 is an enlarged fragmentary cross-section taken substantially along the line 3—3 of FIG. 2 and shows the gooseneck and the latching mechanism in their installed and latched positions, respectively.

FIG. 4 is an enlarged fragmentary cross-section taken substantially along the line 4—4 of FIG. 3.

Figure 5:
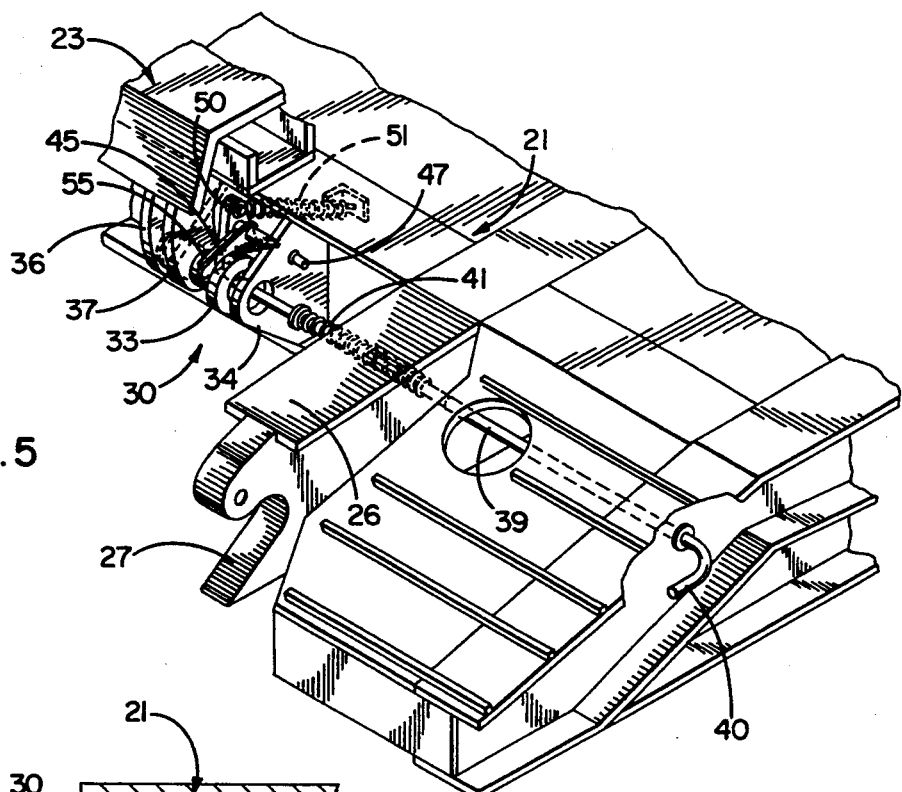
FIG. 5 is a perspective view illustrating a portion of the gooseneck and the platform and showing the gooseneck latched to the platform.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as incorporated in a trailer 20 having a substantially flat cargo-carrying platform 21 whose rear end portion is supported by gangs of wheels 22. Connected to the forward end portion of the platform is a so-called gooseneck hitch 23 which serves to connect the platform to the fifth wheel coupler (not shown) of a towing vehicle. The hitch is commonly referred to as a "gooseneck" because it first extends upwardly from the platform and then extends horizontally toward the towing vehicle.

Figure 6:
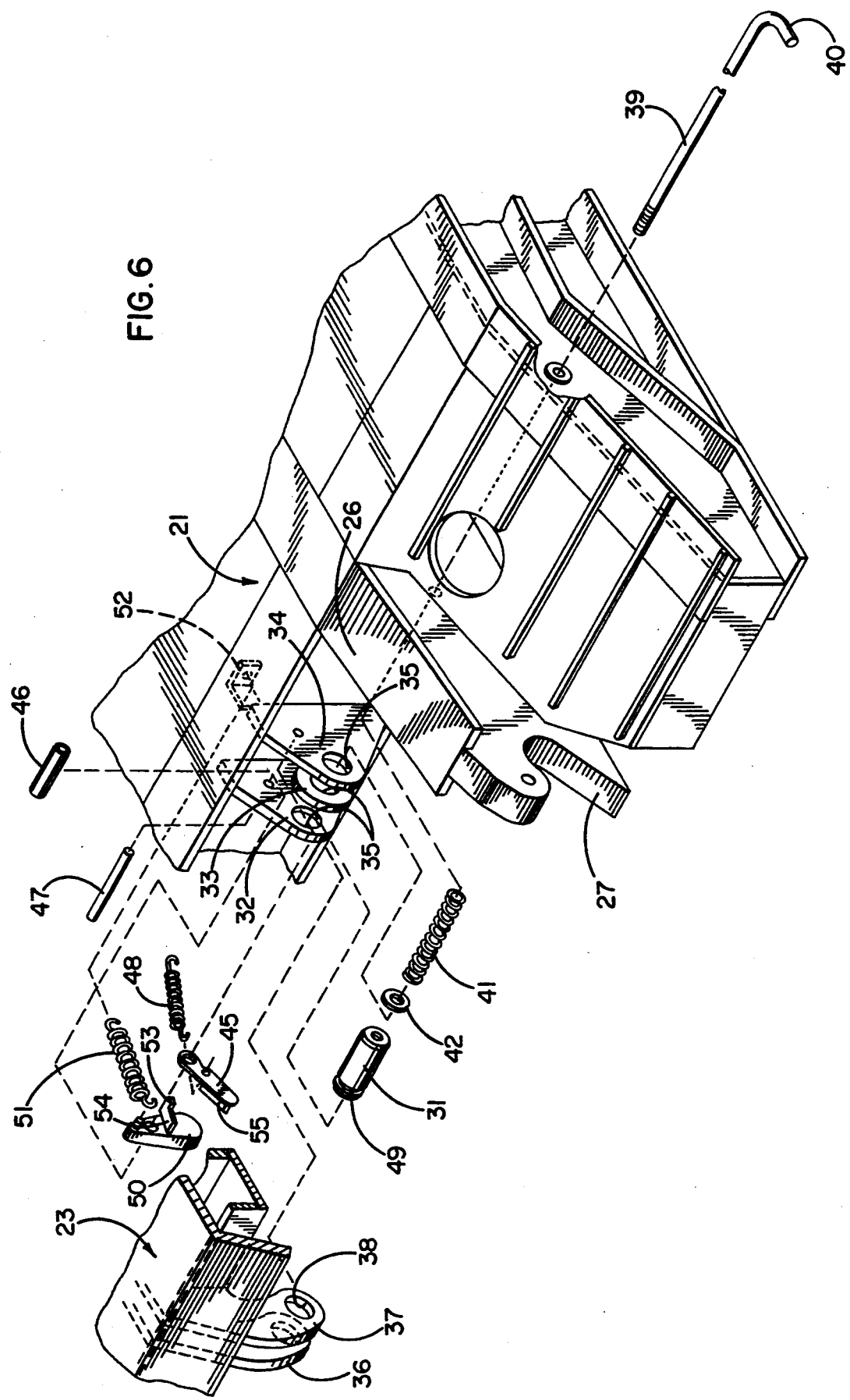
FIG. 6 is an exploded perspective view of the components shown in FIG. 5.

The platform 21 includes laterally spaced beams 26 (one of which is shown in FIGS. 5 and 6) having hooks 27 at their forward ends. The gooseneck 23 includes a laterally extending shaft 28 (FIG. 1) adapted to be received within the hooks. When the gooseneck is coupled to the towing vehicle, the weight of the platform causes the hooks to engage the shaft with such force as to establish a towing connection between the gooseneck and the platform.

It is desirable to keep the gooseneck 23 coupled to the platform 21 when the gooseneck is uncoupled from the towing vehicle and the forward end portion of the platform is lowered to the ground. It also is desirable to be able to remove the gooseneck from the platform to facilitate the loading of cargo onto and the unloading of cargo from the platform.

The present invention contemplates the provision of a unique latching mechanism 30 which normally holds the gooseneck 23 in an installed position on the platform 21, which may be manually unlatched to permit removal of the gooseneck and which automatically re-latches as an incident to the gooseneck being returned to its installed position on the platform. By virtue of the automatic relatching, the trailer operator need not manually manipulate the latching mechanism during installation of the gooseneck and thus the installation task is simplified.

Figure 7:
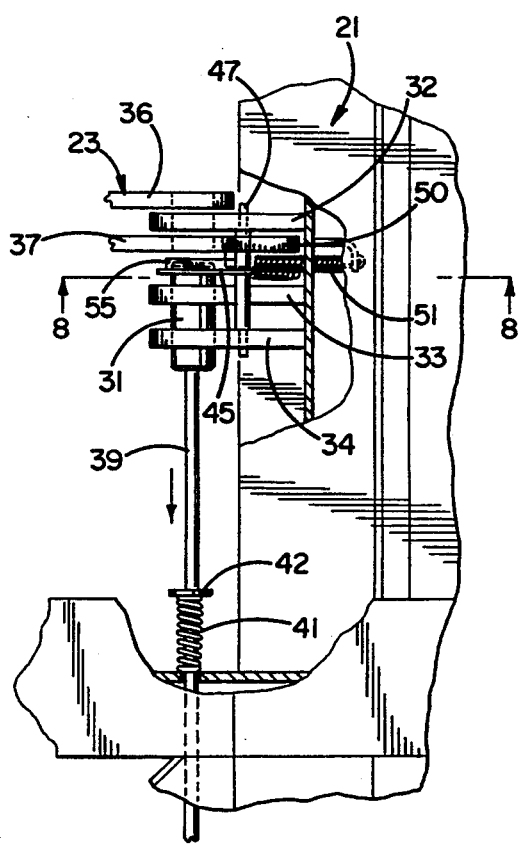
FIG. 7 is a view generally similar to FIG. 3 but shows the latching mechanism in its unlatched position with the gooseneck still in its installed position.

More specifically, the latching mechanism 30 includes a laterally extending and generally horizontal latching pin 31 which is adapted to be shifted laterally between a latched position (FIG. 3) and an unlatched position (FIG. 7). The pin is guided for linear sliding between its positions by three ears 32, 33 and 34 (FIG. 6) rigid with and extending forwardly from a forward portion of the platform 21, each ear being formed with a hole 35 for slidably receiving and guiding the pin. The gooseneck 23 includes a pair of ears 36 and 37 which, when the gooseneck is in its installed position, straddle the platform ear 32. The gooseneck ears 36 and 37 are formed with holes 38 which are adapted to align with the hole 35 in the platform ear 32. When the pin 31 is in its latched position as shown in FIGS. 3 and 5, the pin extends through the holes in the platform ear 32 and the gooseneck ears 36 and 37 and couples the gooseneck 23 to the platform 21 independently of the hooks 27 and the shaft 28. When the pin is shifted to its unlatched position (FIG. 7), it is retracted out of the holes in the ear 32 and the ears 36 and 37 and frees the gooseneck for detachment from the platform.

To enable the latching pin 31 to be shifted to its unlatched position, an actuator in the form of a laterally extending and elongated rod 39 is connected rigidly to one end of the pin and is guided for lateral sliding by the platform 21, there being a handle 40 on the outboard end of the rod. When the rod is shifted outwardly by manually pulling on the handle, the pin is retracted to its unlatched position. A coil spring 41 encircles a portion of the rod and is compressed between the platform and a washer 42 which is fixed to the rod. The spring urges the rod inwardly and tends to shift the pin toward its latched position.

In carrying out the invention, a first detent unit or catch 45 acts to hold the pin 31 in its unlatched position against the bias of the spring 41 once the pin has been shifted to its unlatched position and as long as the gooseneck 23 is in its installed position. Herein, the catch 45 is an elongated metal member whose rear end is supported by a bushing 46 (FIG. 6) which, in turn, is pivotally supported on a rod 47 rigid with and extending between the ears 32 and 34. A contractile spring 48 is connected to the catch and urges the latter downwardly against the latch pin 31. When the pin is in its latched position, the catch simply presses downwardly against the upper surface of the pin. When the pin is retracted to its unlatched position, a recess in the form of an annular groove 49 (FIG. 6) in the free end portion of the pin moves beneath the catch. The spring 48 causes the catch to pivot downwardly into the groove and thereby prevent the spring 41 from returning the pin to its latched position. Accordingly, once the trailer operator pulls on the handle 40 to retract the pin 31 to its unlatched position, the pin will remain in that position without need of the operator continuing to hold the handle. Thus, the operator is free to maneuver the gooseneck 23 as required to remove the gooseneck from the platform 21.

Once the pin 31 has been unlatched, the gooseneck 23 may be pulled away from its installed position on the platform 21. As an incident thereto, the catch 45 is released from the pin but a second detent unit or blocker 50 is triggered and continues to hold the pin in its unlatched position. In this instance, the second detent unit 50 is a bellcrank which is pivotally supported on the bushing 46 alongside the catch 45. A contractile spring 51 (FIG. 6) is connected between the upper end portion of the bellcrank 50 and a bracket 52 on the platform 21 and urges the lower end portion of the bellcrank to swing upwardly and forwardly. The contractile spring 48 for the catch 45 is connected between the catch and a tab 53 (FIG. 6) on one side of the bellcrank.

Figure 8:
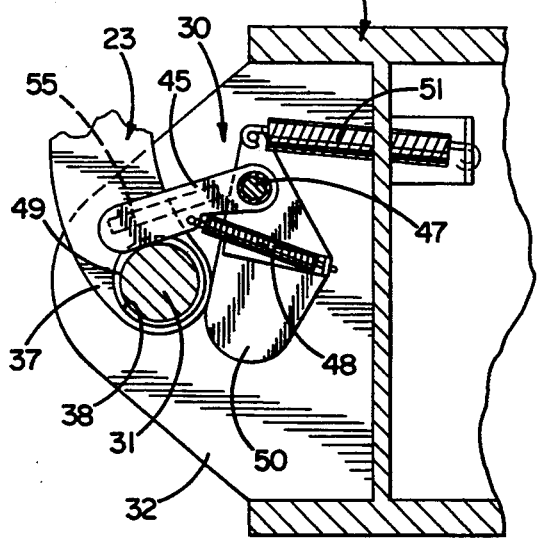
FIG. 8 is an enlarged fragmentary cross-section taken substantially along the line 8—8 of FIG. 7.
Figure 10:
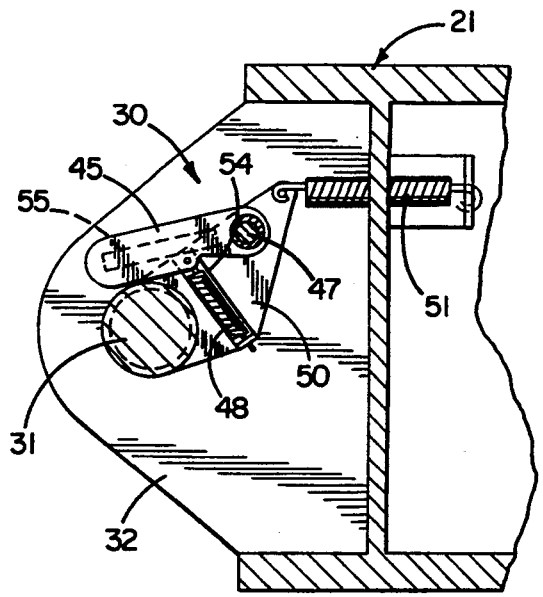
FIG. 10 is an enlarged fragmentary cross-section taken substantially along the line 10—10 of FIG. 9.

The bellcrank 50 is positioned laterally such that it is aligned with the ear 37 of the gooseneck 23. When the gooseneck is in its installed position, the spring 51 urges the lower end portion of the bellcrank 50 against the rear side of the ear 37 as shown in FIGS. 4 and 8. As the ear 37 is pulled away from the platform 21 during removal of the gooseneck, the lower end portion of the bellcrank 50 swings upwardly to a position disposed in the path of but spaced laterally a short distance from the free end of the pin 31 so as to subsequently prevent the pin from shifting to its latched position under the bias of the spring 41. With continued swinging of the bellcrank, a lug 54 (FIG. 6) on one side of the bellcrank engages a lug 55 on the adjacent side of the catch 45 and swings the catch upwardly to an inactive position (FIG. 10) in which the catch is spaced upwardly from the pin 31 and is located out of the groove 49. Simultaneously therewith, the spring 41 shifts the pin 31 a short distance toward its latched position to move the groove 49 out from beneath the catch 45. The pin, however, is blocked against returning to its latched position by virtue of the free end of the pin engaging the bellcrank 50.

Figure 9:
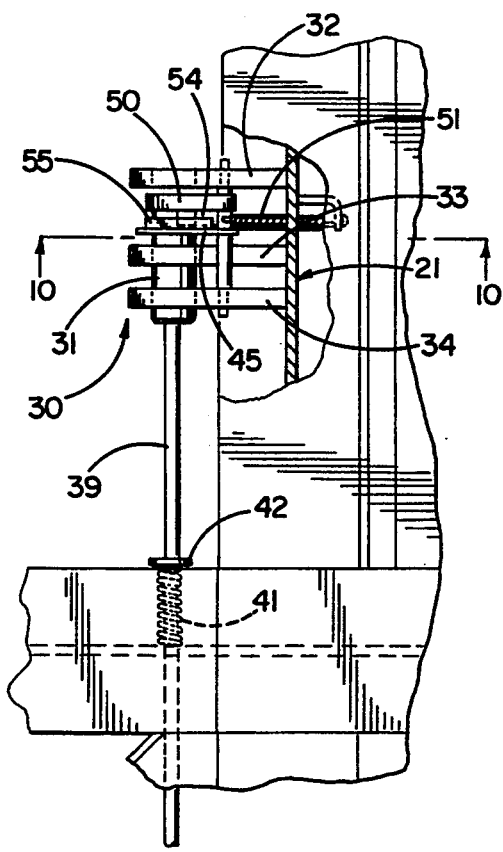
FIG. 9 is another view similar to FIG. 3 but shows the latching mechanism in its unlatched position with the gooseneck removed from its installed position.

Accordingly, during the time the gooseneck 23 is removed from the platform 21, the latch pin 31 is held in its unlatched position as a result of the free end of the pin engaging the side of the bellcrank 50. At such time, the catch 45—which kept the pin unlatched prior to removal of the gooseneck—simply is disposed in an idle position spaced above the pin and spaced laterally from the groove 49 (see FIGS. 9 and 10).

Figure 11:
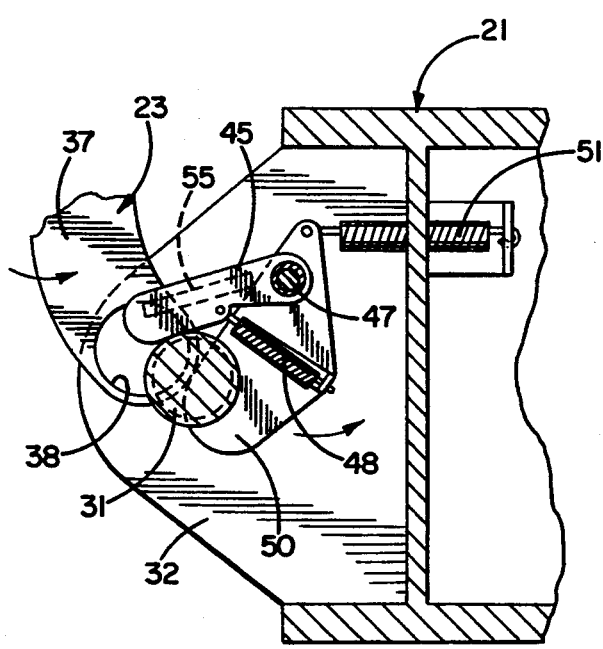
FIG. 11 is a view similar to FIG. 10 but shows the gooseneck being returned to its installed position and causing the latching mechanism to be restored to its latched position.

As the gooseneck 23 is re-installed, the gooseneck ear 37 engages the front edge surface of the lower end portion of the bellcrank 50 and forces the bellcrank to pivot counterclockwise and out of the path of the pin 31 (see FIG. 11). Thus, as soon as the holes 38 in the bellcrank ears 36 and 37 are aligned with the pin 31, the spring 41 automatically forces the pin through such holes and through the hole 35 in the platform ear 32 so as to latch the gooseneck 23 to the platform 21. During counterclockwise swinging of the bellcrank, the catch 45 returns to its original position (FIG. 4) against the upper side of the pin 31.

From the foregoing, it will be apparent that the present invention brings to the art a new and improved latching mechanism 30 in which the catch 45 is responsive to movement of the actuator rod 39 and holds the latch pin 31 in its unlatched position once the pin has been moved to that position and as long as the gooseneck 23 is in its installed position. The bellcrank 50 is responsive to movement of the gooseneck from its installed position and releases the catch 45 while, at the same time, preventing the pin 31 from moving to its latched position. Upon re-installation of the gooseneck 23, the ear 37 cams the bellcrank 50 to an inactive position permitting automatic latching of the pin 31. Thus, the trailer operator need not attend to the latching mechanism 30 during installation of the gooseneck and may focus upon obtaining proper alignment of the ears 36 and 37 with the pin 31.

We claim:

1. A trailer having a wheeled platform, having a gooseneck for connecting said platform to a towing vehicle, and having a latch biased toward and normally disposed in a latched position releasably retaining said gooseneck in an installed position on said platform, means for manually moving said latch to an unlatched position permitting said gooseneck to be detached from said platform and pulled away from said installed position, and holding means responsive to movement of said latch to said unlatched position to automatically hold said latch in said unlatched position when said latch is manually moved to said unlatched position and said gooseneck is pulled away from said installed position, said holding means also being responsive to the return of said gooseneck toward said installed position to automatically release said latch and permit said latch to return to said latched position thereby retaining said gooseneck on said platform.

2. A trailer having a wheeled platform, having a gooseneck for connecting said platform to a towing vehicle, and having a latching mechanism for releasably latching said gooseneck to said platform, said gooseneck and said platform each having an ear formed with a hole, said holes being aligned with one another when said gooseneck ear is in an installed position with respect to said platform ear, said latching mechanism comprising a latching pin normally disposed in a latched position extending through said holes to latch the gooseneck ear to the platform ear, an actuator connected to said pin and manually movable in one direction to pull said pin linearly to an unlatched position in which said pin is retracted out of the hole in the gooseneck ear thereby to permit such ear to be pulled away from the platform ear, a spring resiliently biasing said pin toward said latched position, detent means responsive to movement of said pin to said unlatched position for automatically holding said pin in said unlatched position against the force of said spring whereby said pin remains in said unlatched position when said actuator is manually released and when the gooseneck ear is pulled away from said installed position with respect to said platform ear, and said detent means including means for automatically releasing said pin from said unlatched position in response to return of said gooseneck ear to said installed position thereby to permit said pin to move to said latched position under the urging of said spring.

3. A trailer as defined in claim 2 in which said pin includes a recess, said detent means comprising a catch movably mounted on said platform and biased to move downwardly against said pin, said recess being spaced from said catch when said pin is in said latched position and moving beneath said catch as said pin is moved to said unlatched position whereby said catch falls downwardly into said recess to hold said pin in said unlatched position.

4. A trailer as defined in claim 3 in which said detent means further comprise a blocker pivotally mounted on said platform, spring means biasing said blocker to swing forwardly, said blocker being biased against said gooseneck ear and being disposed in an inactive position when said gooseneck ear is in said installed position, said spring means swinging said blocker forwardly to an active position as said gooseneck ear is pulled away from said installed position, said blocker engaging said catch and swinging said catch upwardly out of said recess as said blocker is swung forwardly to said active position, and said blocker, when in said active position, engaging said pin and preventing said pin from moving to said latched position.

5. A trailer as defined in claim 4 in which said blocker and said catch are located such that said blocker allows said pin to move a short distance toward said latched position when said blocker swings said catch out of said recess whereby said recess moves out from beneath said catch when said blocker is in said active position.

6. A trailer as defined in claim 5 in which said blocker includes a surface which is engaged by said gooseneck ear when said gooseneck ear is returned toward said installed position, engagement of said gooseneck ear with said surface camming said blocker rearwardly to said inactive position and out of engagement with said pin to permit said pin to move to said latched position, said blocker permitting said catch to swing downwardly against said pin as said blocker swings rearwardly to said inactive position.

* * * * *